Patented Nov. 25, 1930

1,782,923

UNITED STATES PATENT OFFICE

KONRAD HOFMANN, OF ESSEN, GERMANY, ASSIGNOR TO FRIED. KRUPP AKTIENGESELLSCHAFT, OF ESSEN-ON-THE-RUHR, GERMANY

PURIFYING PIG IRON

No Drawing. Application filed May 9, 1929, Serial No. 361,831, and in Germany May 25, 1928.

The invention relates to a process for eliminating from phosphorous and sulphurous pig iron the phosphorus and the sulphur without oxidizing the carbon contained in the pig iron.

It is already known to obtain this effect by exposing the liquid pig iron to the simultaneous action of carbon monoxide, or of gases containing carbon monoxide, and of basic means, such as lime, carbonate of sodium and the like. This process, however, has the disadvantage that is can be carried out technically only in a basic converter as a blast process and that special precautions have to be taken to prevent freezing of the charge in the converter. The invention has for its object a process suited to obtain the object aimed at and adapted to be carried out without special precautions also in the hearth furnace. This object is obtained according to the invention by the fact that carbon in liquid or solid state is added to a dephosphorizing and desulphurizing slag.

The process forming the subject-matter of the invention may be carried out e. g. in the following manner. A dephosphorizing and desulphurizing slag is applied to the pig iron bath in a furnace of usual design (e. g. in a hearth furnace, rotary tubular furnace, or in the forehearth or hearth of a shaft furnace) which slag contains the fining means (e. g. iron or manganese oxides or other oxidizing moterials) and, besides, the basic constituents (e. g. alkalin earth, oxides of alkalin or of heavy metals) required to bind the oxide of phosphorus ($P_2O_5$), to which slag further a certain quantity of carbon is added in pulverized or granular form or in liquid state (tar or carbonaceous combinations (salts)). One may proceed also by putting on the pig iron to be purified in the hearth furnace first a layer of carbon or carbonaceous combinations (salts) and then applying on to the pig iron covered with carbon the indicated dephosphorizing and desulphurizing slag. By the addition of carbon to the dephosphorizing and desulphurizing slag the effect of this slag is so moderated that on the one hand the content of phosphorus of the pig iron oxidizes and, on the other hand, the content of carbon is protected from combustion. So for instance in a pig iron originally containing 1 to 2 per cent of phosphorus the content of phosphorus is lowered by applying one or two slags to values which are below 0.01 per cent, that is to values to be found only rarely even in the best Swedish pig iron, without the percentage of carbon of the pig iron being substantially altered during the purification. In the employment of the process forming the subject-matter of the invention it is immaterial whether the pig iron to be purified possesses the usual content of carbon of the normal blast furnace pig iron or more or less thereof. For, by correspondingly tuning the fining temperature, fining means, and carbon addition it is possible to keep the carbon content constant during the purification, or to somewhat lower or even raise it. Furthermore, as tests have clearly shown, the described process is within wide limits independent of the temperature employed, due to the carbon contained in the slag.

The presence of carbon in the dephosphorizing and desulphurizing slag finally has the effect that the finish slag obtained is comparatively poor in oxides of iron, silicon and manganese. This comparatively high freedom of the slag from these oxides renders it particularly capable of taking up sulphur so that also the sulphur is eliminated from the pig iron to a large extent by governing the process in this manner. Hence, it is possible to maintain, with the aid of the present process, the content of silicon and of manganese of the pig iron in a degree to which it cannot be maintained by the use of the carbonless dephosphorizing slag hitherto employed, and therefore the final product is a pig iron which, owing to its high percentage of silicon and manganese, has a higher value for the subsequent finish fining process than a pig iron that is poor in these substances.

I claim:

1. The process consisting in purifying pig iron by means of a dephosphorizing and desulphurizing slag to which carbon has been added.

2. The process consisting in purifying pig iron by means of a dephosphorizing and desulphurizing slag to which carbon in non-gaseous state has been added.

3. The process as specified in claim 1, in which the percentage of carbon of the pig iron to be purified is controlled by suitably determining the quantity of the fining means and carbon of the slag and the temperature of the slag and of the pig iron bath.

The foregoing specification signed at Cologne, Germany, this 23rd day of April, 1929.

KONRAD HOFMANN.